(12) United States Patent
Chopra et al.

(10) Patent No.: US 11,494,250 B1
(45) Date of Patent: *Nov. 8, 2022

(54) METHOD AND SYSTEM FOR VARIABLE LEVEL OF LOGGING BASED ON (LONG TERM STEADY STATE) SYSTEM ERROR EQUILIBRIUM

(71) Applicant: EMC IP Holding Company LLC, Hopkinton, MA (US)

(72) Inventors: Shelesh Chopra, Bangalore (IN); Mahantesh Ambaljeri, Bangalore (IN); Girish Chandra Belmanu Sadananda, Bangalore (IN); Gururaj Kulkarni, Bangalore (IN); Rahul Deo Vishwakarma, Kolkata (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/388,810

(22) Filed: Jul. 29, 2021

(30) Foreign Application Priority Data

Jun. 14, 2021 (IN) .............................. 202141026346

(51) Int. Cl.
*G06F 11/00* (2006.01)
*G06F 11/07* (2006.01)
*G06F 11/34* (2006.01)

(52) U.S. Cl.
CPC ...... *G06F 11/0778* (2013.01); *G06F 11/0754* (2013.01); *G06F 11/3476* (2013.01); *G06F 11/0709* (2013.01)

(58) Field of Classification Search
CPC ............... G06F 11/0754; G06F 11/076; G06F 11/0766; G06F 11/0778; G06F 11/0781; G06F 11/34; G06F 11/3476
See application file for complete search history.

(56) References Cited

U.S. PATENT DOCUMENTS

| | | | |
|---|---|---|---|
| 11,354,113 B1 | 6/2022 | Verma et al. | |
| 2001/0012025 A1 | 8/2001 | Wojaczynski et al. | |
| 2002/0017566 A1 | 2/2002 | Knowles | |
| 2002/0052864 A1 | 5/2002 | Yamamoto | |
| 2008/0022274 A1 | 1/2008 | Shieh | |
| 2015/0149826 A1 | 5/2015 | Anderson et al. | |
| 2015/0178637 A1 | 6/2015 | Bogojeska et al. | |
| 2017/0034023 A1 | 2/2017 | Nickolov et al. | |
| 2017/0155549 A1* | 6/2017 | Bouz | H04L 41/069 |
| 2017/0161130 A1* | 6/2017 | Goldstein | G01M 99/005 |
| 2017/0278007 A1* | 9/2017 | Anchuri | G06F 11/30 |
| 2018/0302303 A1 | 10/2018 | Skovron et al. | |
| 2018/0375719 A1 | 12/2018 | Bouz et al. | |
| 2019/0067558 A1* | 2/2019 | Floyd | G06F 11/0706 |
| 2019/0286552 A1* | 9/2019 | Sharma | G06F 11/3688 |
| 2020/0019393 A1 | 1/2020 | Vichare et al. | |
| 2020/0183800 A1* | 6/2020 | Lyu | G06F 11/2082 |
| 2021/0064356 A1 | 3/2021 | Toma et al. | |

(Continued)

*Primary Examiner* — Marc Duncan
(74) *Attorney, Agent, or Firm* — Chamberlain, Hrdlicka, White, Williams & Aughtry

(57) ABSTRACT

In general, embodiments of the invention relate to a method for enabling enhanced logging. The method includes obtaining historical data for a target entity, determining a steady state error probability of the target entity using the historical data, and enabling, based on the steady state error probability, a first level of enhanced logging on the target entity.

18 Claims, 8 Drawing Sheets

(56) References Cited

U.S. PATENT DOCUMENTS

2021/0311817 A1* 10/2021 Badiger .............. G06F 11/0778
2021/0349707 A1    11/2021 Coutinho et al.
2021/0374027 A1* 12/2021 Joglekar ............. G06F 11/3409

* cited by examiner

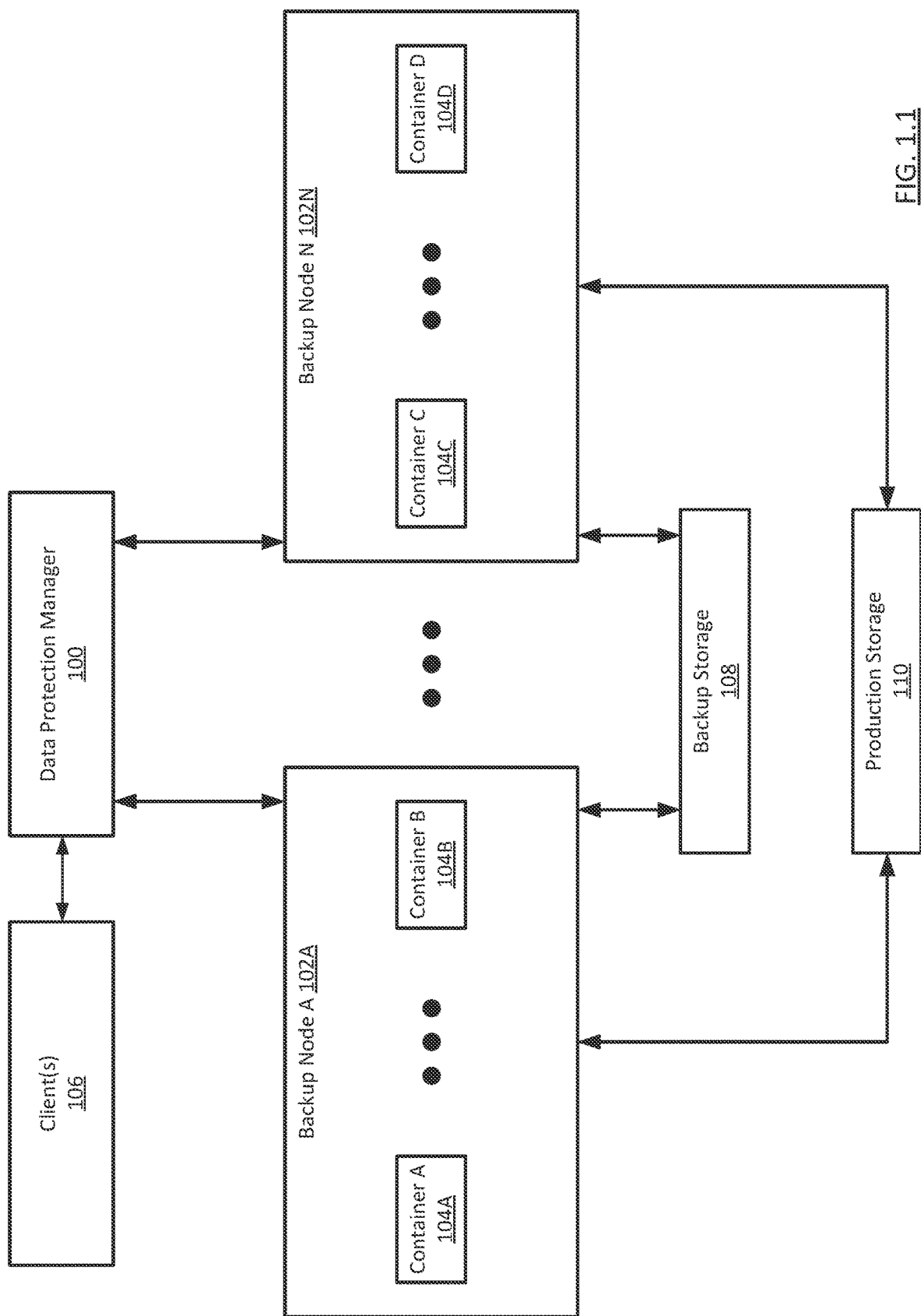
FIG. 1.1

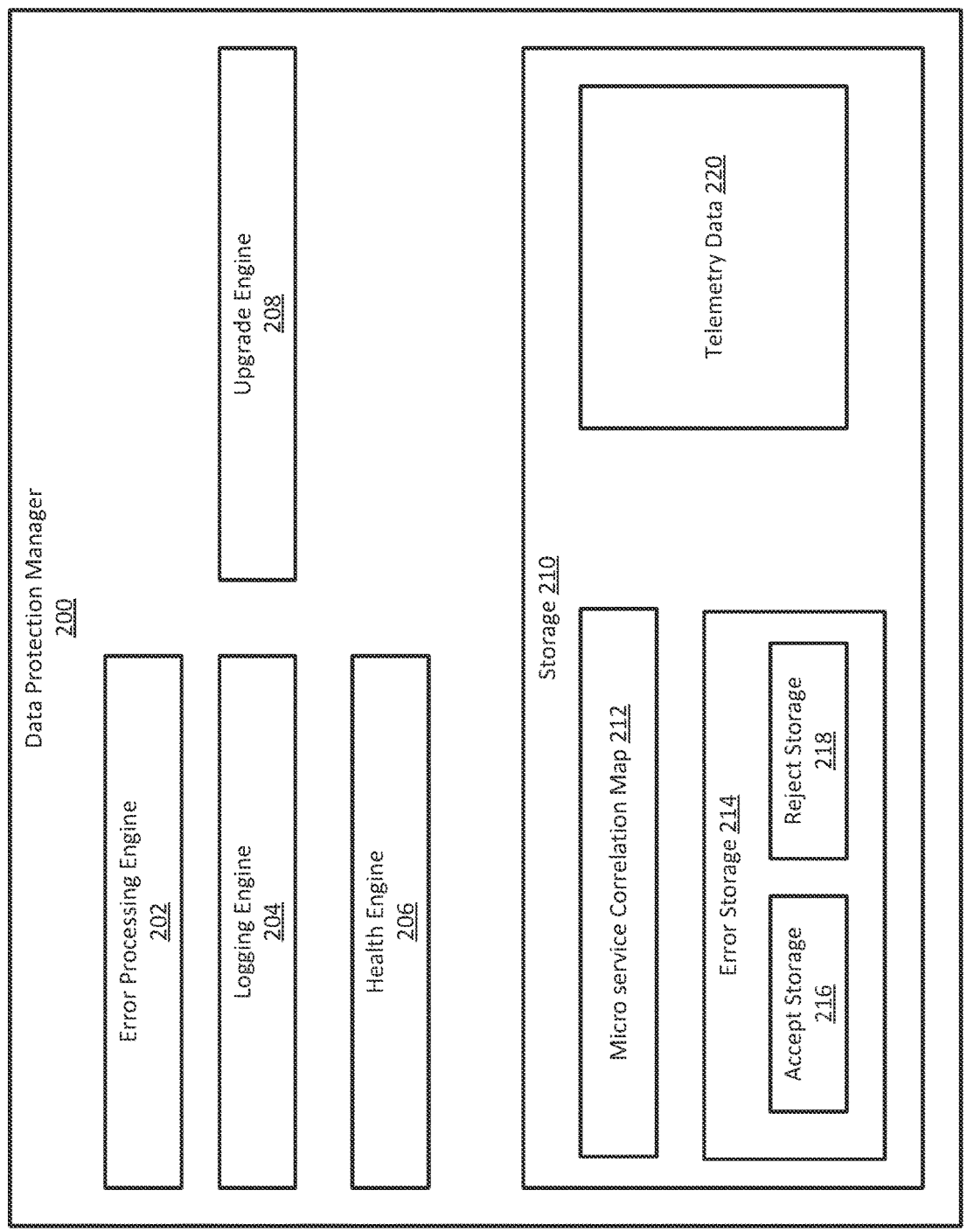
FIG. 1.2

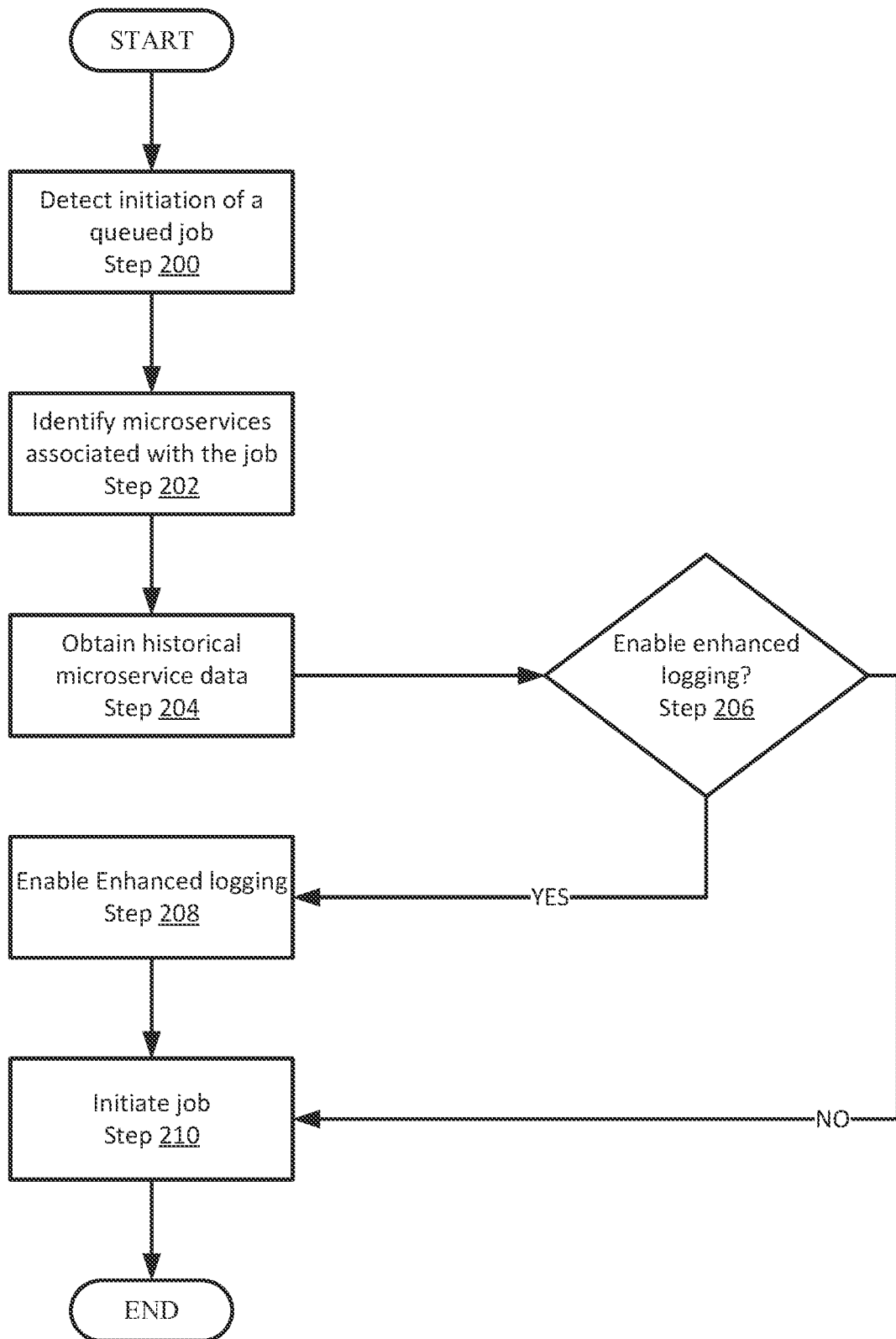
FIG. 2.1

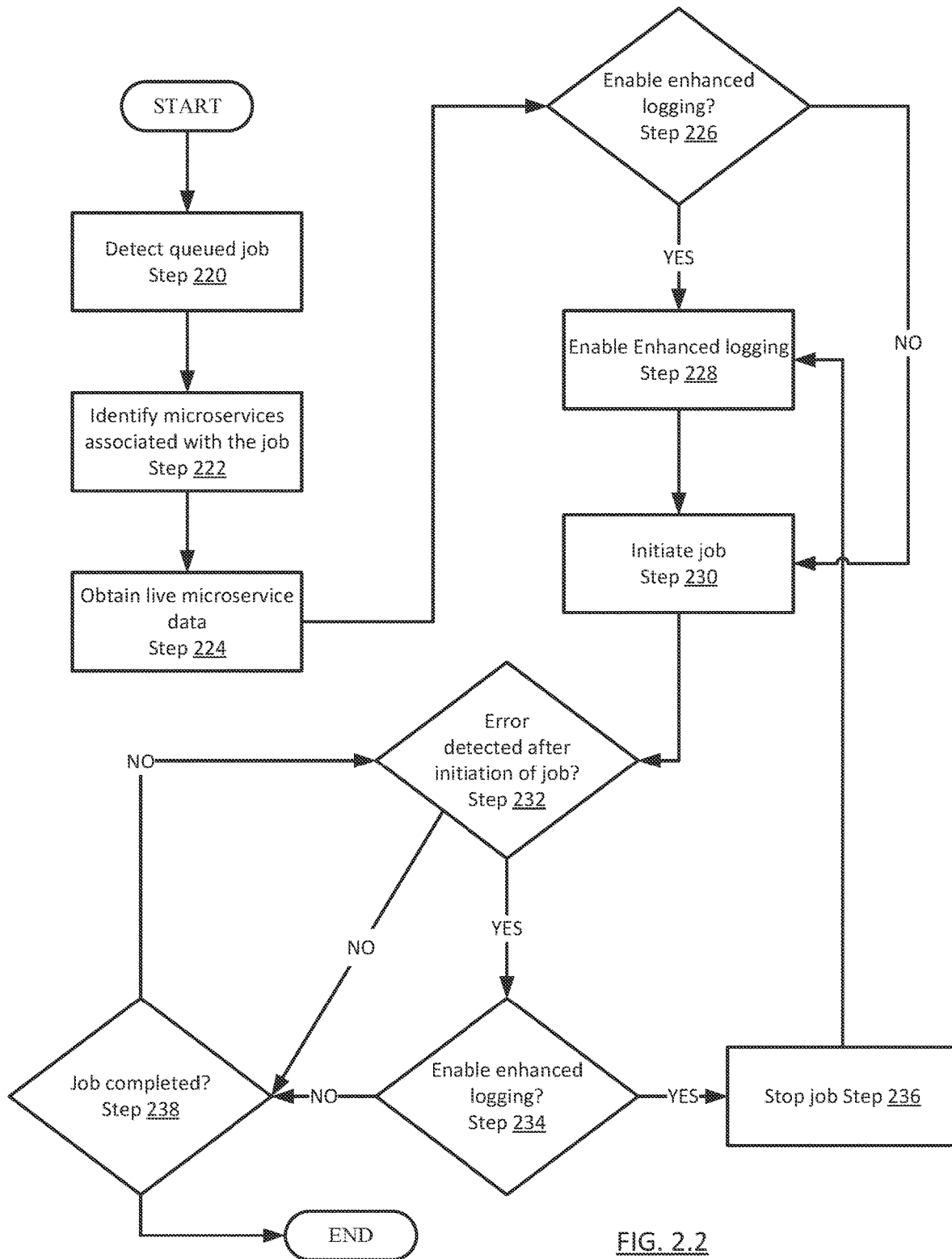
FIG. 2.2

METHOD AND SYSTEM FOR VARIABLE LEVEL OF LOGGING BASED ON (LONG TERM STEADY STATE) SYSTEM ERROR EQUILIBRIUM

BACKGROUND

Computing devices in a system may include any number of internal components such as processors, memory, and persistent storage. As computing devices experience failures, internal or external systems may track undesirable behaviors by applications executed using the internal components.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a system in accordance with one or more embodiments of the invention.

FIG. 1.2 shows a data protection manager in accordance with one or more embodiments of the invention.

FIG. 2.1 shows a method for enabling enhanced logging in an offline mode in accordance with one or more embodiments of the invention.

FIG. 2.2 shows a method for enabling enhanced logging in an online mode in accordance with one or more embodiments of the invention.

DETAILED DESCRIPTION

Figure 3:
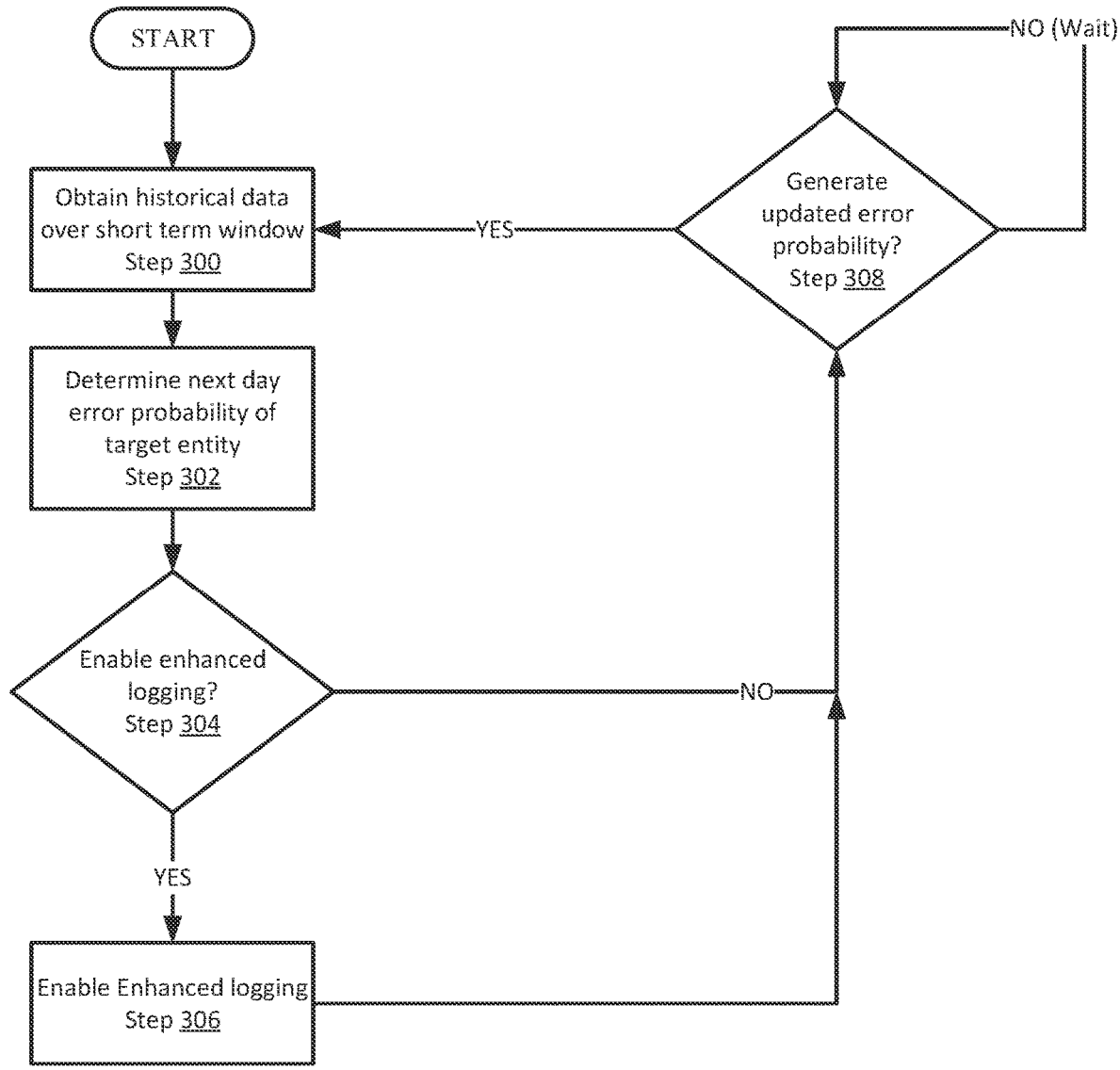
FIG. 3 shows a method for predicting when to enable enhanced logging in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure, having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

In general, embodiments of the invention relate to enabling and utilizing enhanced logging. More specifically, as systems operate they generate logs. A primary purpose of these logs is to provide users (e.g., administrators) with information about the operation of the systems. The logs are typically used by administrators (or technical support specialists) when they are trying to diagnosis a problem with the system. When diagnosing a problem within the system, the users ideally have access to very detailed logs for the system. However, the more detailed the logs the more space they occupy on the system and the more computing resources they utilize. Thus, administrators have to balance obtaining detailed logs and minimizing the amount of space (and computing resources) the logging utilizes on the system. To address this and other related issues, embodiments of the invention relate to a method of intelligently enabling enhanced logging. Said another way, embodiments of the invention relate to predicting when to enable enhanced logging (see e.g., FIGS. 2.1-4) and the level of enhanced logging to enable (see e.g., FIG. 4). Further, once the users are able to obtain a more robust data (via the intelligent logging), the more robust data may be used to provide the user with insights into their systems and where certain operations are recommended. For example, the more robust data may be used to provide insights into how long a potential upgrade of the system may take, and predict whether the upgrade will be successful (see e.g., FIG. 5).

The aforementioned predictions enable enhanced logging to be performed when there is higher likelihood of errors in the system (and hence the need for more detailed logs to diagnose the cause of the errors), and enhanced logging to be turned off (or reduce logging levels) when there is a lower likelihood of errors (and, as such, a lower likelihood that an administrator will need to utilize the non-enhanced logs). Thus, embodiments of the invention balance the administrator's need to have detailed logs when there is an error and minimize (or limit) the amount of space and system resources that the logs utilize.

FIG. 1.1 shows a system in accordance with one or more embodiments of the invention. The system includes a data protection manager (100), one or more backup nodes (102A, 102N), one or more clients (106), a backup storage (108) and production storage (110). The system may include additional, fewer, and/or different components without departing from the invention. Each component may be operably connected to any of the other components via any combination of wired and/or wireless connections. Each component illustrated in FIG. 1.1 is discussed below.

In one embodiment of the invention, the data protection manager (100) includes functionality to manage backup operations. Specifically, the data protection manager (100) includes functionality to orchestrate backup operations. The orchestration includes creating one or more jobs, and then distributing the jobs to the backup nodes to execute the one or more jobs. While the data protection manager (100) orchestrates the backup operations, e.g., orchestrates the servicing of the backup requests, the work required to backup data that is the subject of the backup request, is primarily done by one or more backup nodes.

Further, in one or more embodiments of the invention, the jobs may be serviced using a set of microservices. For example, if the job is a backup job then the following four microservices are used to service the job—application discovery manager (ADM), an agent service, a workflow service, and a user interface (UI) service. These microservices may be implemented on one or more backup nodes (e.g., in one or more containers) and work collectively to service the job.

The data protection manager (100) provides the functionality described throughout this application and/or all, or a portion thereof, of the methods illustrated in FIGS. 2.1-5.

Figure 6:
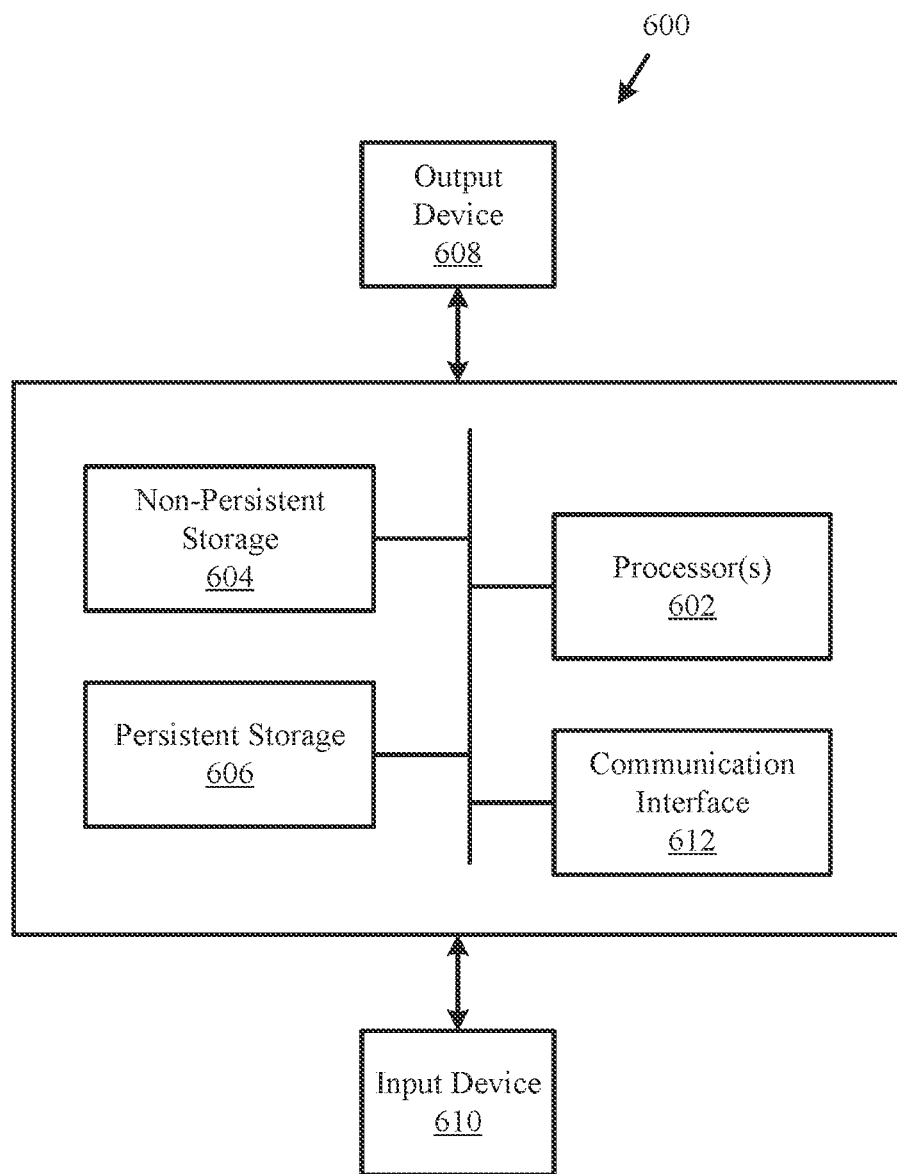
FIG. 6 shows a computing device in accordance with one or more embodiments of the invention.

In one or more embodiments of the invention, the data protection manager (100) is implemented as a computing device (see e.g., FIG. 6). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device, cause the computing device to perform the functionality of the data protection manager (100) described throughout this application.

In one or more embodiments of the invention, the data protection manager (100) is implemented as a logical device. The logical device may utilize the computing resources of any number of computing devices, and thereby provide the functionality of the data protection manager (100) described throughout this application.

Additional details about the data protection manager are provided in FIG. 1.2.

In one embodiment of the invention, the backup node (102A, 102N) includes functionality to interact with the data protection manager (100) to receive jobs, and to provide telemetry information (which may, but is not required to be) in real-time or near real-time. The backup node (102A, 102N) may include functionality to: (a) instantiate one or more containers (104A, 104B, 104C, 104D) to execute one or more jobs created by the data protection manager (100), and (b), optionally, to shut down and/or remove one or more containers once they have completed processing the job(s).

In one or more embodiments of the invention, a container (104A, 104B, 104C, 104D) is software executing on a backup node. The container may be an independent software instance that executes within a larger container management software instance (e.g., Docker®, Kubernetes®). In embodiments in which the container is executing as an isolated software instance, the container may establish a semi-isolated virtual environment, inside the container, in which to execute one or more applications.

In one embodiment of the invention, the container may be executing in "user space" (e.g., a layer of the software that utilizes low-level system components for the execution of applications) of the operating system of the backup node.

In one or more embodiments of the invention, the container includes one or more applications (which may be in the form of microservices). An application is software executing within the container that includes functionality to process the jobs issued by the data protection manager. As discussed above, jobs may be processed using a set of microservices, where the microservices may be executing on one or more containers executing on one or more backup nodes. In addition to the aforementioned functionality, the backup nodes (102A, 102N) provide the functionality described throughout this application.

In one or more embodiments of the invention, the backup nodes (102A, 102N) are implemented as computing devices (see e.g., FIG. 6). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device, cause the computing device to perform the functionality of the backup nodes (102A, 102N) described throughout this application.

In one or more embodiments of the invention, backup nodes (102A, 102N) are implemented as logical devices. The logical device may utilize the computing resources of any number of computing devices, and thereby provide the functionality of the backup nodes (102A, 102N) described throughout this application.

In one embodiment of the invention, the backup storage (108) includes any combination of volatile and non-volatile storage (e.g., persistent storage) that stores backup copies of the data that was (and may still be) in the production storage. The backup storage may store data in any known or later discovered format.

In one embodiment of the invention, the production storage (110) includes any combination of volatile and non-volatile storage (e.g., persistent storage) that stores data that is being actively used by one or more production systems (not shown). The production storage (110) may be referred to as network attached storage (NAS) and may be implemented using any known or later discovered protocols that are used to read from and write data to NAS.

In one embodiment of the invention, the jobs that are serviced by the backup nodes result in data being read from the production storage and then stored on the backup storage to create incremental and/or full backups. The aforementioned reading and/or writing may be performed by one or more microservices.

Continuing with the discussion of FIG. 1.1, in one embodiment of the invention, the client(s) (106) are used by administrators to interact with the data protection manager (100). The administrators, via the clients (106), may send requests to initiate backup operations (see e.g., FIGS. 2.1-4) and/or upgrade requests (see e.g., FIG. 5) and receive corresponding responses.

In one or more embodiments of the invention, the client(s) (106) is implemented as a computing device (see e.g., FIG. 6). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device, cause the computing device to perform the functionality of the client(s) (106) described throughout this application.

In one or more embodiments of the invention, the client(s) (106) is implemented as a logical device. The logical device may utilize the computing resources of any number of computing devices, and thereby provide the functionality of the backup nodes (102A, 102N) described throughout this application.

FIG. 1.2 shows a data protection manager in accordance with one or more embodiments of the invention. The data protection manager (200) includes an error processing engine (202), a logging engine (204), a health engine (206), an upgrade engine (208), and storage (210). Each of these components is described below.

In one embodiment of the invention, the error processing engine (202) includes functionality to obtain logs from the backup nodes for the microservices executing thereon, and to process the logs. The logs provide details about the operation of the microservices as they perform various portions of a job(s). The logs may record warning messages, error messages, and provide different and/or additional information about the state of the microservice at various points in time (as specified by time stamps). The error processing engine (202) may operate in online mode or in offline mode. When operating in offline mode, the error processing engine (202) obtains the logs after jobs are completed (see e.g., FIG. 2.1); however, when operating in online mode the error processing engine (202) obtains the logs in real-time or near real-time (see FIG. 2.2). The error processing engine includes functionality to process the logs to identify the jobs (or the type of jobs) that were processed and whether such processing was successful or unsuccessful. The processing results in either storing an entry corresponding to the job in a particular storage (e.g., an accept storage or a reject storage) or moving an entry corresponding to the job from the accept storage to the reject storage (or vice versa).

The entries in both the accept and reject storages correspond to errors associated with a job. If there is an error associated with a job (or with a microservice executing a portion of the job) and the job ultimately fails, then an entry associated with the error is placed in the accept storage (or moved from the reject storage to the accept storage). Alternatively, if there is an error associated with a job (or with a microservice executing a portion of the job) and the job ultimately succeeds, then an entry associated with the error is placed in the reject storage (or moved from the accept storage to the reject storage).

The error processing engine (202) may be used to initially populate the accept and reject storages and to move the entries between the accept and reject storages as described above.

In one embodiment of the invention, the logging engine (204) includes functionality to use the error storage to predict when to enable enhanced logging, enable enhanced logging (see e.g., FIGS. 2.1, 2.2, 3, and 4) and/or disable (or deactivate) enhanced logging.

In one embodiment of the invention, the health engine (206) is configured to monitor the utilization of the backup nodes (via received telemetry data), detect anomalies, and, when an anomaly is detected, obtain the logs (which may or may not be enhanced logs) and then send the appropriate logs to the administrator (via the client).

Figure 5:
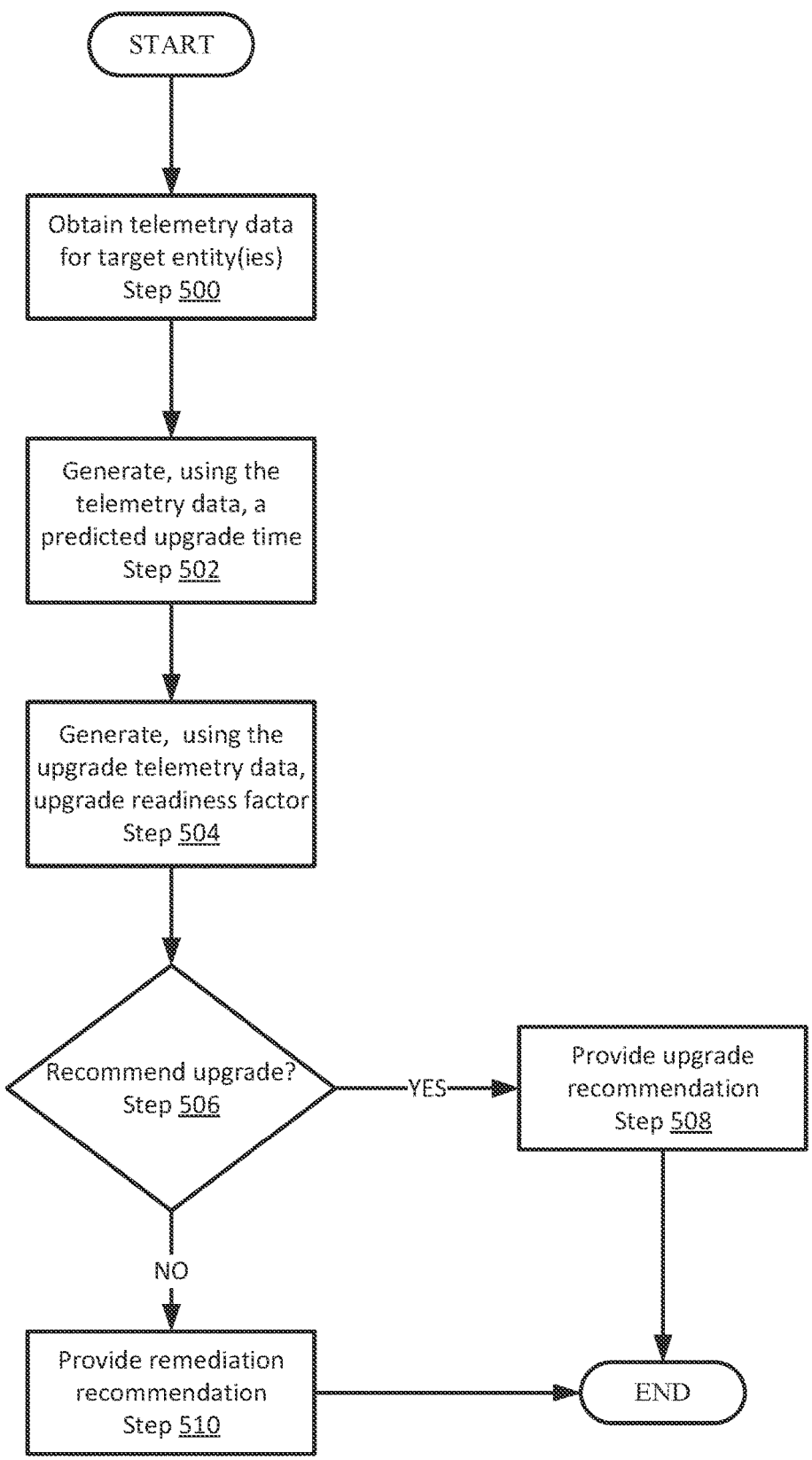
FIG. 5 shows a method for providing upgrade recommendations based on enhanced logging in accordance with one or more embodiments of the invention.

In one embodiment of the invention, the upgrade engine (208) includes functionality to use the enhanced logs to predict an upgrade time for the upgrading of a target system (e.g., a backup node) and to predict whether such an upgrade will be successful (see e.g., FIG. 5).

In one embodiment of the invention, the storage (210), which may be implemented using any combination of volatile and non-volatile media, includes a microservice correlation map (212), an error storage (214), and telemetry data (220). Each of these components is described below.

In one embodiment of the invention, the microservice correlation map (212) specifies the microservices that are used to perform each type of job. This information is used by the error processing engine to obtain the logs associated with one or more microservices that are processing a job (see e.g., FIG. 2.1, 2.2, etc.).

In one embodiment of the invention, the error storage (214) includes the accept storage (216) and the reject storage (218) (as described above). The accept storage (216) and the reject storage (218) store error entries that include information about errors that have been encountered when processing the jobs by the microservices. These entries are used to predict the likelihood of failure of a job (i.e., due to the failure of one or more microservice not being able to complete the portion(s) of the job). The error entries in the accept storage correspond to errors that predict a likely failure of the job, while errors in the reject storage correspond to errors that do not predict a likely failure of the job.

When an error is first encountered (i.e., there is no prior error entry in the accept or reject storage) and there is no indication of whether the job (i.e., the job on which the error occurred) has failed, then an error entry may be placed, e.g., by default, in either the accept storage or reject storage. The error entry may be added to the accept storage by default when the administrator wants to be more cautious and err on the side of obtaining enhanced logs. In contrast, the error entry may be added to the reject storage by default when the administrator wants to initially preserve storage space and minimize computing resource usage.

In one embodiment of the invention, the telemetry data (220) includes data that is collected from the backup nodes (e.g., 102A, 102N). The telemetry data may include information (at any level of granularity) about the configuration, the current state, the errors, and/or warnings associated with the backup nodes or any of the microservices executing thereon (which may be executing in containers). Though not shown in FIGS. 1.1-1.2, the backup nodes, the containers, and/or the microservices may include logging functionality and/or logging agents to collect the aforementioned data, which is ultimately stored in one or more logs.

While the system of FIGS. 1.1-1.2 have been illustrated and described as including a limited number of specific components, a system in accordance with embodiments of the invention may include additional, fewer, and/or different components without departing from the invention FIG. 2.1 shows a method for enabling enhanced logging in an offline mode in accordance with one or more embodiments of the invention. The method shown in FIG. 2.1 may be performed by, for example, a data protection manager. Other components of the system in FIGS. 1.1-1.2 may perform all, or a portion, of the method of FIG. 2.1 without departing from the invention.

While FIG. 2.1 is illustrated as a series of steps, any of the steps may be omitted, performed in a different order, additional steps may be included, and/or any or all of the steps may be performed in a parallel and/or partially overlapping manner without departing from the invention.

In step 200, the logging engine detects that a job (e.g., a job related to a backup operation) has been generated and placed in a queue within the data protection manager.

In step 202, the logging engine, using the microservice correlation map, determines which microservices will be used to service the job. Step 202 is performed in order for the logging engine to obtain and analyze the appropriate logs. For example, if there are ten microservices (M1-M10), and four microservices (M2, M3, M5, M8) are used to service the job, then by using the microservice correlation map, the logging engine can identify the four aforementioned microservices so that it can then (in the following steps) obtain and analyze the logs associated with the four microservices.

In step 204, the logging engine obtains, from the storage (FIG. 1.2, 210) the logs (also referred to as historical microservice data) stored in the telemetry data (FIG. 1.2, 220) for the identified microservices (i.e., the microservices identified in Step 202). The logs obtained in step 204 correspond to logs that were obtained prior to step 200. Said another way, the logs are not obtained in real-time. Thus, while the logs may be continuously generated on the backup nodes, the logs may only be periodically sent to the data protection manager. Accordingly, these logs most likely do not represent the most recent information about the microservices (see e.g., FIG. 2.2. for scenarios in which the logs are obtained in real-time or near real-time).

In step 206, a determination is made, using the logs obtained in step 204, about whether to enable enhanced logging. In one embodiment of the invention, the logs are analyzed to: (i) identify portions of the logs that are associated with jobs that are the same type as the job that is initiated in step 210, (ii) if there are portions associated with a job of the same type, then identify errors in the associated portions; (iii) if there are errors in the associated portions, then the identified errors are compared to the entries in the accept storage or the reject storage; (iv) if there is an entry in the accept storage that matches the error identified in (iii), then enhanced logging is enabled (i.e., because previously jobs of the same type have experienced this error failed), and (v) if there is no entry in the accept storage and/or there is an entry in the reject storage that matches the error identified in (iii), then enhanced logging is not enabled (i.e., because previously, jobs of the same type have experienced this error, and still successfully completed).

If enhanced logging is to be enabled, the process proceeds to step 208; otherwise, the process proceeds to step 210.

In step 208, enhanced logging is enabled by the data protection manager. More specifically, the data protection manager sends one or more commands (or instructions) to the appropriate logging agents associated with the microservices (i.e., the microservices identified in step 202) to perform enhanced logging.

In one embodiment of the invention, the amount of detail that is included in a log may vary. The log may include a minimum set of data (which is referred to as a non-enhanced log). This minimal set of data corresponds to the set of data that provides the administrators with information about the operation of a system, but is typically not sufficient to resolve all errors (especially complex errors). The specific amount of data that is included in the minimal set of data may be specified by the data protection manager, by the administrator, and/or by any other entity. An enhanced log is a log that includes more information than the minimal data set. For example, if there are 100 variables that may be logged, the minimal data set may only include data about ten of these variables while the enhanced log may include between eleven and 100 variables. In one embodiment of the invention, the non-enhanced logging includes the minimal set of data while the enhanced logging includes the maximum set of data. Continuing with the above example, the non-enhanced log includes data related to ten variables while the enhanced log includes data for 100 variables. As discussed in, e.g., in FIG. 4, there may be scenarios in which there may be multiple levels of logging (including multiple level of enhanced logging). These scenarios are discussed in FIG. 4.

Continuing with the discussion of FIG. 2.1, in step 210 (which may be performed directly after step 206 or 208), the job is initiated. Initiating the job may include the data protection manager instructing one or more microservices (via the backup nodes or containers) to perform all or a portion of the job.

Regardless of whether or not enhanced logging is enabled, logs (which may or may not be enhanced) are obtained and stored locally on the backup nodes. The stored logs may be periodically provided, e.g., via one or more REpresentational State Transfer (REST) application programming interfaces (APIs) to the data protection manager. The data protection manager (or more specifically, the error processing engine) processes the logs where the processing may result in updates to the error storage (as discussed above).

The aforementioned process may be performed each time a queued job is identified. Further, once the job is complete, the data protection manager may send commands to return the logging back to non-enhanced logging (if enhanced logging was previously enabled).

FIG. 2.2 shows a method for enabling enhanced logging in an online mode in accordance with one or more embodiments of the invention. The method shown in FIG. 2.2 may be performed by, for example, a data protection manager. Other components of the system in FIGS. 1.1-1.2 may perform all, or a portion, of the method of FIG. 2.1 without departing from the invention.

While FIG. 2.2 is illustrated as a series of steps, any of the steps may be omitted, performed in a different order, additional steps may be included, and/or any or all of the steps may be performed in a parallel and/or partially overlapping manner without departing from the invention.

In step 220, the logging engine detects that a job (e.g., a job related to a backup operation) has been generated and placed in a queue within the data protection manager.

In step 222, the logging engine, using the microservice correlation map, determines which microservices will be used to service the job. Step 202 is performed in order for the logging engine to obtain and analyze the appropriate logs. For example, if there are ten microservices (M1-M10), and four microservices (M2, M3, M5, M8) are used to service the job, then by using the microservice correlation map, the logging engine can identify the four aforementioned microservices so that it can then (in the following steps) obtain and analyze the logs associated with the four microservices.

In step 224, the logging engine obtains, from the identified microservices (i.e., the microservices identified in step 222) (directly or via the backup node(s) or container(s) in which they are executing), logs (also referred to as live microservice data). The logs obtained in step 224 correspond to logs that are obtained in real-time or near real-time (e.g., close in time to when the logs are generated). More specifically, as discussed above, the logs may be continuously generated on the backup nodes; however, the logs are typically only periodically sent to the data protection manager. Accordingly, the logs that are stored in the telemetry data (220, FIG. 1.2) most likely do not represent the most recent information about the microservices. In contrast, the logs obtained in step 224 correspond to the most up-to-date logs, which reflect the current state of the microservices (and/or the containers and/or backup nodes on which they are operating).

In step 226, a determination is made, using the logs obtained in step 224, about whether to enable enhanced logging. The determination in step 226 is substantially similar to step 206 in FIG. 2.1. If enhanced logging is to be enabled, the process proceeds to step 228; otherwise, the process proceeds to step 230.

In step 228, enhanced logging is enabled by the data protection manager. Step 228 is substantially similar to step 208 in FIG. 2.1.

In step 230, which may be performed directly after step 226 or 228, the job is initiated. Initiating the job may include the data protection manager instructing one or more microservices (via the backup nodes or containers) to perform all or a portion of the job.

Regardless of whether or not enhanced logging is enabled, logs (which may or may not be enhanced) are obtained and stored locally on the backup nodes. The data protection manager (e.g., the error processing engine) may continue to obtain and process logs, in real-time or near real-time, while the job is being processed by the microservices (i.e., the microservices identified in step 222). The processing of the logs may result in updates (in real-time or near real-time) to the error storage (as discussed above).

In step 232, a determination is made about whether an error has been detected. The detection of the error may be the result of the aforementioned processing of the error logs that are continuously obtained by the data protection manager while the job is being processed. If an error is detected, the process proceeds to step 234; otherwise, the process proceeds to step 238.

In step 234, a determination is made, based on the error detected in step 232, about whether to enable enhanced logging. The determination in step 234 is substantially similar to step 206 in FIG. 2.1. If enhanced logging is to be enabled, the process proceeds to step 226; otherwise, the process proceeds to step 238 if enhanced logging is not to be enabled, or if enhanced logging is already enabled.

In step 236, when enhanced logging is to be enabled, the data protection manager stops the current executing job and the proceeds to steps 228-230 (which ultimately results in the job restarting with enhanced logging enabled).

In step 238, a determination is made if the job has completed. If the job has not completed, then the process proceeds to step 232; otherwise, the process ends.

Figure 4:
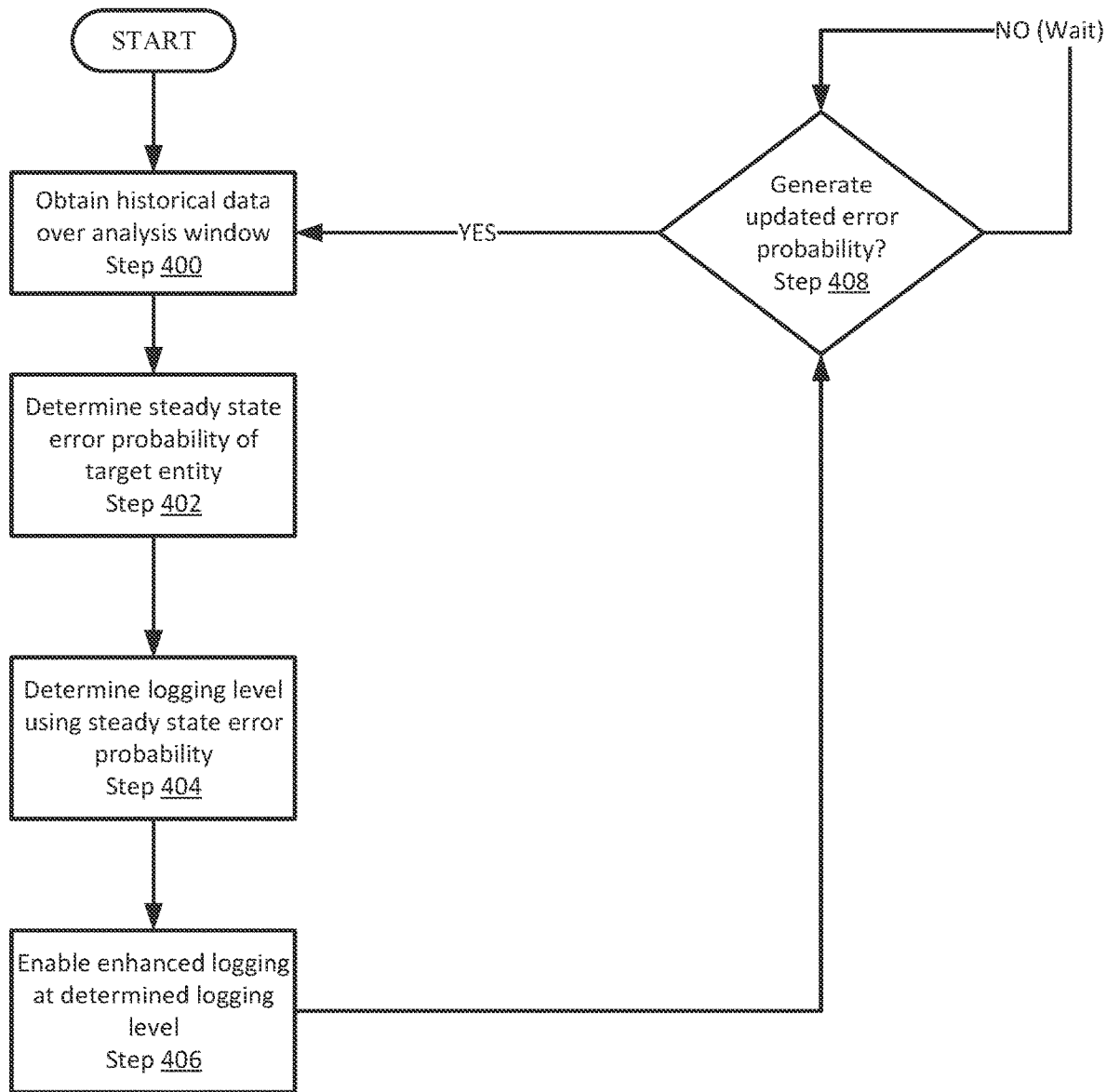
FIG. 4 shows a method for enabling variable enhanced logging in accordance with one or more embodiments of the invention.

FIGS. 2.1-2.2 provide embodiments directed to determining when to enable enhanced logging in response to a job queued for servicing by the data protection manager. FIGS. 3-4 provide embodiments directed to proactive activation of enhanced logging in scenarios in which the data protection manager predicts, based on the telemetry data (220, FIG. 1.2), that there is a high likelihood of failure and, as such, the administrator would benefit from receiving an enhanced log as opposed to a non-enhanced log. FIG. 3 focuses on enabling or disabling enhanced logging based on recent logs received in a short term window (e.g., within the past 24 hours) and then enabling or disabling enhanced logging accordingly. FIG. 4 focuses on using the logs over an analysis window (which may be the same of different than the short term window) to determine the likelihood of failure over the long term (i.e., when the microservices, containers, and/or backup nodes reach a steady state). The result of this determination is whether to activate enhanced logging and, if activated, at what level of enhanced logging.

FIG. 3 shows a method for predicting when to enable enhanced logging in accordance with one or more embodiments of the invention. The method shown in FIG. 3 may be performed by, for example, a data protection manager. Other components of the system in FIGS. 1.1-1.2 may perform all, or a portion, of the method of FIG. 3 without departing from the invention.

While FIG. 3 is illustrated as a series of steps, any of the steps may be omitted, performed in a different order, additional steps may be included, and/or any or all of the steps may be performed in a parallel and/or partially overlapping manner without departing from the invention.

In step 300, the logging engine obtains, from the storage (FIG. 1.2, 210) the logs (also referred to as historical data) stored in the telemetry data (FIG. 1.2, 220) for a target entity (e.g., a microservice(s), a container(s), a backup node(s)) for a specified short term window. The short term window may be for the last 24 hours (or any other time period without departing from the invention). However, the logs should provide a good representation of the state and operation of the target entity over a recent period of time.

In step 302, the next day error probability of the target entity is determined. The next day error probability is determined by: (i) identifying the errors and the warnings in the logs to determine an initial state; (ii) determine, over the short term window the transition probabilities, which includes: (a) the probability that a target entity in the warning state will remain in the warning state, (b) the probability that a target entity in the error state will remain in the error state; (c) the probability that the target entity will transition from the warning state to the error state, and (d) the probability that the target entity will transition from the error state to the warning state.

In one embodiment of the invention, a warning may be issued by a target entity, and then the warning is logged. The warning may be for a specific issue, e.g., memory usage. If warnings are continued to be generated for this issue then the target entity may be considered to be in a warning state for this issue; however, if an error message is logged for this issue, then the target entity may be considered to have transitioned to an error state for this issue. If the errors continued to be logged for this issue, then the target entity may be considered to remain in the error state for this issue; however, if the target entity improves with respect to this issue then instead of logging errors, warnings may be logged for this issue. In this case, the target entity is considered to have transitioned from an error state to a warning state.

The following example further illustrates the use of the aforementioned states. For example, consider a scenario in which the logs indicate that 25% of the messages are warning messages and 75% of the messages are error messages. Further, assume that 88% of the time warning messages remained warning messages (i.e., remained in the warning state), 12% of the time the warning messages transitioned to an error state (i.e., an error message replaced the prior warning message for a given issue on the target entity), 85% of the time error messages remained error messages (i.e., remained in the error state), 15% of the time the error messages transitioned to a warning state (i.e., a warning message replaced the prior error message for a given issue on the target entity).

The initial state and the transition probabilities are used to generate the next day (or other time window) probability.

Continuing with the above example, using matrix multiplication, the transition probability (expressed as a 2×2 matrix) is multiplied by the initial state (expressed as 2×1 matrix) to obtain a 2×1 matrix the represents the next day (or other time window) probability (see below).

(0.88/0.15 0.12/0.85)(0.25/0.75)=(0.3325/0.6675)

Thus, in this example, the data protection manager may predict that there is a 33.25% chance that the state of the target entity will be in a warning state, and a 66.75% chance that the target entity will be in an error state.

Continuing with the FIG. 3, in step 304, a determination is made, using the error probability determined in step 302 about whether to enable enhanced logging. The determination in step 304 may be based on comparing the predicted error percentage (i.e., likelihood of the target entity being in an error state within the next period of time (referred to as the target period) (e.g., the next 24 hours)) with a threshold value. If the predicted error percentage is greater than (or equal to or greater than) the threshold, then a determination is made to activate enhanced logging for the target period (e.g., 24 hours). If enhanced logging is to be enabled, the process proceeds to step 306; otherwise, the process proceeds to step 308.

In step 306, enhanced logging is enabled by the data protection manager. More specifically, the data protection manager sends one or more commands (or instructions) to the appropriate logging agents associated with the target entity to perform enhanced logging.

In step 308, a determination is made about whether to generate an updated error probability. If an updated error probability is to be determined, the process proceeds to step 300; otherwise, the logging for the target entity (which is either enhanced or non-enhanced) continues without change for a target period (or duration) After the target period (e.g., 24 hours) has elapsed the determination in step 308 may be performed again.

In one embodiment of the invention, the method in FIG. 3 may be repeated periodically (e.g., after the expiration of the target period) to dynamically adjust the type of logging that is being performed. In this manner as the target entity changes over time, there may be increased logging (e.g., more enhanced logging) or decreased logging (e.g., less enhanced logging). By periodically adjusting the logging levels, embodiments of the invention proactively enable more detailed logs to be collected when there is higher likelihood that the target entity will fail, and proactively decrease the logging level (or maintain the logging level as non-enhanced) when there is a low(er) likelihood that the target entity will fail.

FIG. 4 shows a method for enabling variable enhanced logging in accordance with one or more embodiments of the invention. The method shown in FIG. 4 may be performed by, for example, a data protection manager. Other components of the system in FIGS. 1.1-1.2 may perform all, or a portion, of the method of FIG. 4 without departing from the invention.

While FIG. 4 is illustrated as a series of steps, any of the steps may be omitted, performed in a different order, additional steps may be included, and/or any or all of the steps may be performed in a parallel and/or partially overlapping manner without departing from the invention.

In step 400, the logging engine obtains, from the storage (FIG. 1.2, 210) the logs (also referred to as historical data) stored in the telemetry data (FIG. 1.2, 220) for a target entity (e.g., a microservice(s), a container(s), a backup node(s)) for a specified analysis window (which may be the same or different than the short term window).

In step 402, the steady state error probability of the target entity is determined. The steady state error probability is determined by: (i) identifying the errors and the warnings in the logs to determine an initial state; (ii) determine, over the short term window the transition probabilities, which includes: (a) the probability that a target entity in the warning state will remain in the warning state, (b) the probability that a target entity in the error state will remain in the error state; (c) the probability that the target entity will transition from the warning state to the error state, and (d) the probability that the target entity will transition from the error state to the warning state.

For example, consider a scenario which the logs indicate that 25% of the messages are warning messages and 75% of the messages are error messages. Further, assume that 88% of the time warning messages remained warning messages (i.e., remained in the warning state), 12% of the time the warning messages transitioned to an error state (i.e., an error message replaced the prior warning message for a given issue on the target entity), 85% of the time error messages remained error messages (i.e., remained in the error state), 15% of the time the error messages transitioned to a warning state (i.e., an warning message replaced the prior error message for a given issue on the target entity).

The initial state and the transition probabilities are used to generate the steady state probability.

Continuing with the above example, the steady state probability may be determined as follows:

$$W=0.88*W+0.15*E$$

$$E=0.12*W+0.85*E$$

$$E+W=1$$

Solving for W and E, using the aforementioned equations results in the following steady state probability: $E=0.44$ and $W=0.56$. Accordingly, when viewed over the short term (see e.g., FIG. 3), the error probability indicated that within the next 24 hours there was a 66.75% likelihood of an error; while the steady state probability indicates that there is a 44% likelihood of an error over the long term. Thus, when viewed over different time scales the error probability (i.e., the likelihood that the target entity will be in an error state) is different. This allows the administrator to take both a short term view and a long term view of the target entity.

Continuing with the discussion of FIG. 4, in step 404, the level of logging to enable is determined. The level of logging may be proportional to the error probability (also referred to as the steady state error probability). The data protection manager may support any granularity of logging and maintain a log level mapping between steady state error probability ranges and logging level. The higher the logging level the more data that is collected.

For example, if there are 100 variables of the target entity that can be tracked with logging, then the following log level mapping may be used.

TABLE 1

Log Level Mapping

| Log Level | Steady state error probability range | Variables Recorded |
|---|---|---|
| 1 | 0-10 | 10 |
| 2 | 11-30 | 30 |

TABLE 1-continued

Log Level Mapping

| Log Level | Steady state error probability range | Variables Recorded |
|---|---|---|
| 3 | 31-60 | 50 |
| 4 | 60-79 | 80 |
| 5 | 80+ | 100 |

The aforementioned example is not intended to limit the scope of the invention.

In step 406, enhanced logging at the determined level is enabled by the data protection manager. More specifically, the data protection manager sends one or more commands (or instructions) to the appropriate logging agents associated with the target entity to perform enhanced logging at the determined level.

In step 408, a determination is made about whether to generate an updated steady state error probability. If an updated steady state error probability is to be determined, the process proceeds to step 400; otherwise, the logging for the target entity at the previously determined level continues without change.

In one embodiment of the invention, the method in FIG. 4 may be repeated periodically (e.g., every 24 hours, 48 hours, etc.) to dynamically adjust the type of logging that is being performed. In this manner as the target entity changes over time, there may be increased logging (e.g., more enhanced logging) or decreased logging (e.g., less enhanced logging). By periodically adjusting the logging levels, embodiments of the invention proactively enable more detailed logs to be collected when there is higher likelihood that the target entity will fail, and proactively decrease the logging level (or maintain the logging level as non-enhanced) when there is a low(er) likelihood that the target entity will fail.

In one embodiment of the invention, the steady state error probability may also be used to notify the administrator if the steady state error probability indicates that the target entity is operating outside an expected range (i.e., it has a higher steady state error probability as compared to other similar target entities).

In one embodiment of the invention, FIG. 3 and FIG. 4 may be used in combination by the administrator on a target system. For example, FIG. 4 may be used to set a baseline logging level (which may be greater than a minimum level of logging). By using this approach, more than the minimum amount of data may be collected for a given target set as the default setting and when enhanced logging is required (per step 304), the maximum amount of data is obtained. This enables a more robust set of logs while still attempting to intelligently limit the amount of data being collected via logging.

In one or more embodiments of the invention, the telemetry data that is collected via the aforementioned methods (see e.g., FIGS. 2.1-4) provides a more robust set of data about the state and operation of the microservices, the containers and/or the backup nodes (also referred to as target entities). This information may be used to provide improved insight into the likelihood of success of other operations on the target entities. For example, with a better understanding of the operation of the target entities, the data protection manager (or more specifically, the upgrade engine (208, FIG. 2)) is able to provide a predicted upgrade time and an upgrade readiness factor. The predicted upgrade time is based on the logs for the target entities, which provide a more realistic view of the health of such target entities. This, in turn, allows for a more accurate prediction of upgrade times for the target entities. The upgrade readiness factor takes into account how similar target entities have performed (i.e., succeeded or failed) when they are subjected to an upgrade. The historical data that is used to determine the upgrade readiness factor may be enhanced logs that are obtained whenever there is an attempt to upgrade a target entity. This historical data may then be used to provide a quantitative view of the likelihood of success of the proposed upgrade and recommendations to address issues, when the upgrade is not recommended, e.g., due to other issues in the target entity.

FIG. 5 shows a method for providing upgrade recommendations based on enhanced logging in accordance with one or more embodiments of the invention. The method shown in FIG. 5 may be performed by, for example, a data protection manager. Other components of the system in FIGS. 1.1-1.2 may perform all, or a portion, of the method of FIG. 5 without departing from the invention.

While FIG. 5 is illustrated as a series of steps, any of the steps may be omitted, performed in a different order, additional steps may be included, and/or any or all of the steps may be performed in a parallel and/or partially overlapping manner without departing from the invention.

In step 500, in response to an upgrade request for a target entity, the data protection manager (or, more specifically, the upgrade engine) obtains telemetry data from the storage. The telemetry data obtained corresponds to the target system and, depending on the target entity, the telemetry data for entities (other than the target entity) on which the target entity is dependent. The dependency information generated using manufactures recommendations, reference architectures for the target entities, (i.e., an approved organization of components within a target entity that is industry standard, and/or created and published by a manufacturer or by any other entity), dependency heuristics provided by (or obtained from an external source). The dependency information may include other and/or additional types of information without departing from the invention.

As discussed above, there may be various classes of telemetry data that is used to perform the predictions in steps 502 and 504. One class of telemetry data is health data that is based on the enhanced logs that are obtained in accordance with FIGS. 2.1-4. These logs provide insight into how the target entities are currently operating and can be used to gauge the health of the target entities. Another class of telemetry data is upgrade data that relates to telemetry data obtained during each attempted upgrade of the target entity (or target entities of the same type).

In step 502, a predicted upgrade time is generated using the telemetry data obtained in step 500. The predicted upgrade time may take into account the time it took for the similar target entity to upgrade. If the target entity is composed of multiple sub-components then the upgrade time of the sub-components may be determined and then aggregated to obtain the predicted upgrade time of the target entity. The upgrade time for a sub-component may take into account the historical upgrade time(s) of similar sub-components (obtain from the upgrade data) along with the health of the sub-component. The health of the sub-component may be determined by reviewing the health data and determining the prevalence of errors and/or warning messages. Accordingly, the upgrade time for a sub-component may be determined as follows: predicted upgrade time for a sub-component=f (historical upgrade time of similar sub-components, health of sub-component). In this scenario, the upgrade time of the target entity is the sum of the upgrade times for the sub-components. If there are no sub-components in the target entity, then the upgrade time for a target entity may be determined as follows: predicted upgrade time for target entity=f (historical upgrade time of similar target entities, health of target entity).

In one embodiment of the invention, if the health of the target entity (or a sub-component thereof) is relatively low (as compared to the health of target entities that were used to determine the historical upgrade time), then the predicted upgrade time is increased relative to the historical upgrade time. Similarly, if the health of the target entity (or a sub-component thereof) is relatively high (as compared to the health of target entities that were used to determine the historical upgrade time), then the predicted upgrade time is decreased relative to the historical upgrade time.

In scenarios in which the target entity is dependent on another entity, then the upgrade time of the target entity may be the combination of, the upgrade time of the target entity (as determined above), and the upgrade time of the entity upon which the target entity is dependent. The upgrade time of the entity upon which the target entity is dependent may be determined in substantially the same manner as the upgrade time of the target entity (discussed above).

In one embodiment of the invention, the aforementioned historical upgrade time(s) may be determined using regression (or another machine learning algorithms, known or later discovered). Further, such machine learning algorithms may be retrained (or updated, e.g., using reinforcement learning) using logs that are retrieved periodically from the target entities and entities upon which the target entity depends.

In step 504, an upgrade readiness factor is determined using the telemetry data obtained in step 500. The upgrade readiness factor may be expressed as follows: upgrade readiness factor=(upgrade issues fixed)/upgrade issues fixed).

In one embodiment of the invention, the issues identified may be determined by reviewing the telemetry data (or more specifically upgrade data), and identifying update issues and whether these update issues have been fixed. The determination of what constitutes an update issue and what constitutes a fix of such issue, may be determined using any form of heuristics and/or machine learning. For example, the telemetry data for the target entity may be analyzed to identify whether certain sub-components are properly configured to enable other sub-components in the target entity to be successfully updated. In another example, the telemetry data for the target entity may be analyzed to identify whether certain sub-components are running the appropriate firmware. The invention is not limited to the aforementioned examples. Once the issues are identified and a determination is made about whether the issue is deemed fixed (by analyzing the telemetry data), the upgrade readiness factor may be generated.

If administrator has multiple similar target entities to update, then the above analysis may be performed on one such target entity to determine an upgrade readiness factor. This upgrade readiness factor may then be applied to all other similar target entities, thereby reducing the processing overhead to determine the upgrade readiness factor for each of the similar target entities.

In step 506, a determination is made about whether to recommend an upgrade of the target entity. The recommendation may be based on a combination of the upgrade readiness factor and the predicted upgrade time. For example, an upgrade may be recommended when the upgrade readiness factor is at or above a threshold, and the predicted upgrade time is within a range (e.g., one standard deviation) from the historical upgrade times. However, a recommendation may not be recommended if the upgrade readiness factor is below a threshold, or the predicted upgrade time is outside a range (e.g., greater than one standard deviation) from the historical upgrade times. The upgrade readiness factor is below a threshold when there are too many unresolved (i.e. not fixed) issues. The predicted upgrade time is outside a range when, e.g., the health of the target entity (or its sub-component(s)) result in a longer than expected predicted upgrade time.

If a recommendation is recommended, the method proceeds to step 508; otherwise, the method proceeds to step 510.

In step 508, a notification, e.g., on the client's graphical user interface, is presented to the user which indicates the predicted upgrade readiness factor and the predicted upgrade time. In addition, the GUI may include a visual indication (e.g., a green light icon) to indicate that the upgrade of the target entity is recommended.

In step 510, a notification, e.g., on the client's graphical user interface, is presented to the user which indicates the predicted upgrade readiness factor and the predicted upgrade time. In addition, the GUI may include a visual indication (e.g., a red stop sign icon) to indicate that the upgrade of the target entity is not recommended. The GUI may display the difference between the predicted upgrade time and the historical upgrade times, and/or a list of issues that need to be addressed (i.e., fixed) prior to attempting perform the method in FIG. 5 again.

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

The problems discussed above should be understood as being examples of problems solved by embodiments of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention. Accordingly, the scope of the invention should be limited only by the attached claims.

What is claimed is:

1. A method for enabling enhanced logging, comprising:
    obtaining historical data for a target entity;
    determining a steady state error probability of the target entity using the historical data, the determining comprising:
        determining an initial state of the target entity as one selected from a group of states comprising an error state and a warning state; and
        determining a transition probability for the target entity; and
    enabling, based on the steady state error probability, a first level of enhanced logging on the target entity.

2. The method of claim 1, further comprising:
    obtaining, after the enabling, second historical data for the target entity;
    determining a second steady state error probability of the target entity using the second historical data; and
    deactivating, based on the second steady state error probability, the first level of enhanced logging on the target entity on the target entity.

3. The method of claim 2, further comprising:
    after the deactivating the first level of enhanced logging, enabling a second level of enhanced logging on the target entity.

4. The method of claim 3, wherein the first level of enhanced logging comprises less granular data than the second level of enhanced logging.

5. The method of claim 2, wherein enabling, based on the steady state error probability, the first level of enhanced logging on the target entity comprises enabling the enhanced logging for a target period, and wherein the second steady state error probability is determined after the target period has elapsed.

6. The method of claim 1, wherein the transition probability specifies a first probability of the target entity transitioning from the error state to the warning state and a second probability of the target entity transitioning from the warning state to the error state.

7. The method of claim 1, wherein enabling, based on the steady state error probability, the first level of enhanced logging on the target entity comprises selecting the first level of enhanced logging using a log level mapping.

8. The method of claim 1, wherein the target entity is a microservice.

9. The method of claim 1, wherein the target entity is a backup node.

10. A non-transitory computer readable medium comprising computer readable program code, which when executed by a computer processor enables the computer processor to perform a method, the method comprising:
    obtaining historical data for a target entity;
    determining a steady state error probability of the target entity using the historical data, the determining comprising:
        determining an initial state of the target entity as one selected from a group of states comprising an error state and a warning state; and
        determining a transition probability for the target entity; and
    enabling, based on the steady state error probability, a first level of enhanced logging on the target entity.

11. The non-transitory computer readable medium of claim 10, the method further comprising:
    obtaining, after the enabling, second historical data for the target entity;
    determining a second steady state error probability of the target entity using the second historical data; and
    deactivating, based on the second steady state error probability, the first level of enhanced logging on the target entity on the target entity.

12. The non-transitory computer readable medium of claim 11, the method further comprising:
    after the deactivating the first level of enhanced logging, enabling a second level of enhanced logging on the target entity.

13. The non-transitory computer readable medium of claim 12, wherein the first level of enhanced logging comprises less granular data than the second level of enhanced logging.

14. The non-transitory computer readable medium of claim 11, wherein enabling, based on the steady state error probability, the first level of enhanced logging on the target entity comprises enabling the enhanced logging for a target period, and wherein the second error steady state probability is determined after the target period has elapsed.

15. The non-transitory computer readable medium of claim 10, wherein the transition probability specifies a first probability of the target entity transitioning from the error state to the warning state and a second probability of the target entity transitioning from warning state to an error state.

16. The non-transitory computer readable medium of claim 10, wherein enabling, based on the steady state error probability, the first level of enhanced logging on the target entity comprises selecting the first level of enhanced logging using a log level mapping.

17. The non-transitory computer readable medium of claim 10, wherein the target entity is a microservice.

18. The non-transitory computer readable medium of claim 10, wherein the target entity is a backup node.

* * * * *